(12) United States Patent
Fan

(10) Patent No.: US 12,347,054 B2
(45) Date of Patent: Jul. 1, 2025

(54) CREATING AN ENVIRONMENT BASE CLASS FOR CONTROLLING A DISPLAY EFFECT OF A 3D IMAGE

(71) Applicant: BOE Technology Group Co., Ltd., Beijing (CN)

(72) Inventor: Haijun Fan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 23 days.

(21) Appl. No.: 17/489,584

(22) Filed: Sep. 29, 2021

(65) Prior Publication Data

US 2022/0222908 A1 Jul. 14, 2022

(30) Foreign Application Priority Data

Jan. 11, 2021 (CN) .......................... 202110031369.9

(51) Int. Cl.
  *G06T 19/20* (2011.01)
  *G06T 13/20* (2011.01)
  *G06T 15/50* (2011.01)

(52) U.S. Cl.
  CPC .............. *G06T 19/20* (2013.01); *G06T 13/20* (2013.01); *G06T 15/503* (2013.01); *G06T 2219/2004* (2013.01); *G06T 2219/2016* (2013.01)

(58) Field of Classification Search
  None
  See application file for complete search history.

(56) References Cited

U.S. PATENT DOCUMENTS

| 6,563,503 B1* | 5/2003 | Comair | G06T 13/20 345/475 |
| 6,587,109 B1* | 7/2003 | Rose | G06T 13/20 345/428 |
| 2005/0231512 A1* | 10/2005 | Niles | G06T 13/20 345/473 |
| 2008/0049015 A1* | 2/2008 | Elmieh | G06T 13/20 715/700 |

(Continued)

FOREIGN PATENT DOCUMENTS

| CN | 104299252 A | 1/2015 |
| CN | 108717733 A | 10/2018 |

(Continued)

OTHER PUBLICATIONS

Demigiant, captured by the Internet Achive on Aug. 2, 2020, "http://dotween.demigiant.com/examples.php", (Year: 2020).*
CN2021100313699 first office action.

*Primary Examiner* — Kent W Chang
*Assistant Examiner* — Jonathan M Cofino
(74) *Attorney, Agent, or Firm* — IPro, PLLC

(57) ABSTRACT

A method for creating an environment base class for controlling a display effect of a 3D image includes: creating an environment base class, wherein the environment base class at least comprises a function of controlling a display effect of a 3D image to gradually change; invoking, by a state machine, the environment base class to apply the environment base class to a first 3D image and a second 3D image, wherein the environment base class is configured to control a display effect of the first 3D image to be gradually decreased, and control a display effect of the second 3D image to be gradually increased.

18 Claims, 6 Drawing Sheets

(56) References Cited

U.S. PATENT DOCUMENTS

| | | | | |
|---|---|---|---|---|
| 2009/0015679 A1* | 1/2009 | Hayakawa | ............... | G06T 13/20 |
| | | | | 348/207.1 |
| 2009/0021518 A1* | 1/2009 | Harada | ................... | G06T 13/20 |
| | | | | 345/501 |
| 2013/0325319 A1* | 12/2013 | Moore | ............... | G01C 21/3664 |
| | | | | 701/417 |
| 2015/0084991 A1* | 3/2015 | Schutz | ................... | G06T 15/50 |
| | | | | 345/647 |
| 2018/0061107 A1* | 3/2018 | Anderson | ................. | G06T 7/97 |
| 2018/0158230 A1 | 6/2018 | Yan et al. | | |
| 2020/0202597 A1 | 6/2020 | Stokking et al. | | |

FOREIGN PATENT DOCUMENTS

| | | |
|---|---|---|
| CN | 109947338 A | 6/2019 |
| CN | 111355944 A | 6/2020 |

\* cited by examiner

CREATING AN ENVIRONMENT BASE CLASS FOR CONTROLLING A DISPLAY EFFECT OF A 3D IMAGE

CROSS-REFERENCES TO RELATED APPLICATIONS

This patent application claims the priority of the Chinese patent application No. 202110031369.9 filed on Jan. 11, 2021, and entitled "METHOD AND APPARATUS FOR DISPLAYING IMAGE", the entire content of which is incorporated herein by reference.

TECHNICAL FIELD

The present disclosure relate to the technical field of display, in particular to a method and an apparatus for displaying an image, an electronic device and a computer readable storage medium.

BACKGROUND

At present, in switching display of 3D images, an original 3D image is generally set dark or hidden during the switching process, and then a new 3D image is displayed at the position of the original 3D image. Since there is no transition between the original 3D image and the new 3D image during this process, the switching is rather abrupt, and the viewing experience is poor.

SUMMARY

The present disclosure provides a method and an apparatus for displaying an image, an electronic device and a computer readable storage medium, to solve the deficiencies in related art.

In a first aspect of the embodiments of the present disclosure, a method for displaying an image is provided, including:
creating an environment base class, wherein the environment base class at least includes a function of controlling a display effect of a 3D image to gradually change;
invoking, by a state machine, the environment base class to apply the environment base class to a first 3D image and a second 3D image,
wherein the environment base class is configured to control a display effect of the first 3D image to be gradually decreased, and control a display effect of the second 3D image to be gradually increased.
Optionally, the method further includes:
creating a first environment class for the first 3D image, and creating a second environment class for the second 3D environment, wherein the first environment class and the second environment class inherit the environment base class;
wherein invoking, by a state machine, the environment base class to apply the environment base class to a first 3D image and a second 3D image includes:
invoking, by the state machine, the first environment class to apply the first environment class to the first 3D image, and invoking, by the state machine, the second environment class to apply the second environment class to the second 3D image;
wherein the first environment class is configured to control the display effect of the first 3D image to be gradually decreased, and the second environment class is configured to control the display effect of the second 3D image to be gradually decreased.

Optionally, the environment base class further includes a function of controlling a display angle of a 3D image to gradually change, and the first environment base class is also configured to control a display angle of the first 3D image to gradually change from a first angle to a second angle, and the second environment base class is configured to control a display angle of the second 3D image to gradually change from a first angle to a second angle.

Optionally, when the environment base class is invoked by the state machine, an effect processing component management class is invoked;
wherein the effect processing component management class is hung on a root node of the first 3D image and the second 3D image, and when the effect processing component management class is invoked, the effect processing component management class hangs a effect processing component on a grid of the first 3D image and the second 3D image, and the effect processing component is configured to adjust a material ball corresponding to the grid, to control the display effects of the first 3D image and the second 3D image to gradually change.

Optionally, the effect processing component is also configured to generate a DoTween animation to display a process of controlling the display effects of the first 3D image and the second 3D image to gradually change.

Optionally, the method further includes:
according to a first instruction received, suspending the control of the environment base class on the display effect of the first 3D image, and/or suspending the control of the environment base class on the display effect of the second 3D image.

Optionally, the method further includes:
according to a second instruction received, adjusting a speed of the control of the environment base class on the display effect of the first 3D image, and/or adjusting a speed of the control of the environment base class on the display effect of the second 3D image.

Optionally, the second 3D image is superimposed and displayed on the first 3D image.

Optionally, the display effect includes at least one of: transparency, shape, size, position.

Optionally, the first 3D environment image and/or the second 3D environment image includes at least one of: an office, a parking lot, a restaurant, a shopping center, or a house sales office.

In a second aspect of the embodiments of the present disclosure, an apparatus for displaying an image is provided, including one or more processors working individually or in cooperation, and the processors are configured to:
create an environment base class, wherein the environment base class at least includes a function of controlling a display effect of a 3D image to gradually change;
invoke, by a state machine, the environment base class to apply the environment base class to a first 3D image and a second 3D image;
wherein the environment base class is configured to control a display effect of the first 3D image to be gradually decreased, and control a display effect of the second 3D image to be gradually increased.

Optionally, the processors are configured to:
create a first environment class for the first 3D image, and create a second environment class for the second 3D environment, wherein the first environment class and the second environment class inherit the environment base class;

and configured to:

invoke, by the state machine, the first environment class to apply the first environment class to the first 3D image, and invoke, by the state machine, the second environment class to apply the second environment class to the second 3D image;

wherein the first environment class is configured to control the display effect of the first 3D image to be gradually decreased, and the second environment class is configured to control the display effect of the second 3D image to be gradually decreased.

Optionally, the environment base class further includes a function of controlling a display angle of a 3D image to gradually change, and the first environment base class is also configured to control a display angle of the first 3D image to gradually change from a first angle to a second angle, and the second environment base class is configured to control a display angle of the second 3D image to gradually change from a first angle to a second angle.

Optionally, when the environment base class is invoked by the state machine, an effect processing component management class is invoked;

wherein the effect processing component management class is hung on a root node of the first 3D image and the second 3D image, and when the effect processing component management class is invoked, the effect processing component management class hangs a effect processing component on a grid of the first 3D image and the second 3D image, and the effect processing component is configured to adjust a material ball corresponding to the grid, to control the display effects of the first 3D image and the second 3D image to gradually change.

Optionally, the processors are configured to:

according to an instruction received, adjust a speed of the control of the environment base class on the display effect of the first 3D image, and/or adjusting a speed of the control of the environment base class on the display effect of the second 3D image.

In a third aspect of the embodiments of the present disclosure, an electronic device is provided, including:

a processor;

a memory for storing processor executable instructions;

wherein the processor is configured to perform the steps in the method described above.

Optionally, the electronic device is an embedded terminal, and the embedded terminal is provided in an actual environment where the first 3D image and/or the second 3D image are located.

Optionally, an instruction receiving module is provided on the embedded terminal for receiving an instruction and transmitting the received instruction to the processor, wherein the processor is configured to adjust the control of the environment base class on a display effect of the first 3D image and/or adjust a control of the environment base class on the display effect of the second 3D image according to the instruction.

Optionally, the instruction to be received by the receiving module includes at least one of:

a touch instruction, a voice instruction, a physical button instruction, or a light control instruction.

In a fourth aspect of the embodiments of the present disclosure, a computer-readable storage medium having a computer program stored thereon is provided, wherein the program implements the steps in the method of claim 1 when the program is executed by a processor.

It can be seen from the above embodiments that for the first 3D image and the second 3D image, when it is necessary to switch between the two, the environment base class can be applied to the first 3D image and the second 3D image respectively by the state machine, so as to realize switch between the first 3D image and the second 3D image.

The environment base class can control a display effect to gradually change, during a switching process, it is displayed that the display effect of the first environment image is gradually decreased, and the display effect of the second 3D image is gradually increased, so the display effect during the switching process is not abrupt, and the user's viewing experience is better.

In addition, since the environment base class is created in advance, its function of adjusting the display effect can be applied to all 3D images. There is no need to edit different code for different 3D images to control the display effects. During the application process, it is helpful to reduce the amount of code.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
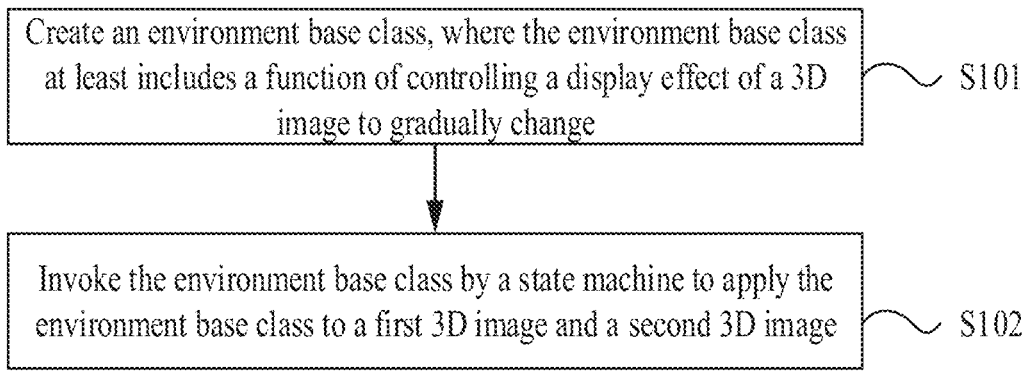
FIG. 1 is a schematic flowchart of an image display according to an implementation of the present disclosure.

Embodiments will be described in detail herein with the illustrations thereof represented in the drawings. When the following descriptions involve the drawings, like numerals in different drawings refer to like or similar elements unless otherwise indicated. The implements described in the following embodiments do not represent all implements consistent with the present disclosure. Rather, they are merely examples of apparatuses and methods consistent with some aspects of the present disclosure as detailed in the appended claims.

FIG. 1 is a schematic flowchart of an image display according to an implementation of the present disclosure. The method for displaying an image can be applied to electronic devices, which include but are not limited to mobile terminals and embedded terminals. The mobile terminals can be, for example, mobile phones, tablet computers, and wearable devices. The embedded terminals can be, for example, Inquiry equipment, navigation equipment, etc., the electronic device can also be a server.

As shown in FIG. 1, the method for displaying an image can include the following steps.

In step S101, an environment base class is created, where the environment base class at least includes a function of controlling a display effect of a 3D image to gradually change.

In step S102, the environment base class is invoked by a state machine to apply the environment base class to a first 3D image and a second 3D image.

Wherein the environment base class is configured to control the display effect of the first 3D image to be gradually decreased, and control the display effect of the second 3D image to be gradually increased.

In an implementation, the display effect includes at least one of the following:

transparency, shape, size, or position.

In an implementation, the first 3D environment image and/or the second 3D environment image can be a 3D image of an environment in a building, and the building includes at least one of the following:

an office, a parking lot, a restaurant, a shopping center, or a house sales office.

In an implementation, the second 3D image can be superimposed and displayed on the first 3D image.

In an implementation, the state machine can be set up first and can create an environment base class. The environment base class can include an algorithm for adjusting a 3D image. The algorithm can have two implementations. One is to gradually decrease the display of a 3D image. The other effect is to gradually increase the display effect of a 3D image. The state machine can apply the environment base class to the 3D image that needs to have the display effect adjusted.

Further, for the first 3D image and the second 3D image, when it is necessary to switch between the two, the environment base class can be applied to the first 3D image and the second 3D image respectively by the state machine, so as to realize switch between the first 3D image and the second 3D image.

The environment base class can control a display effect to gradually change, during a switching process, it is displayed that the display effect of the first environment image is gradually decreased, and the display effect of the second 3D image is gradually increased, so the display effect during the switching process is not abrupt, and the user's viewing experience is better.

In addition, since the environment base class is created in advance, its function of adjusting the display effect can be applied to all 3D images. There is no need to edit different code for different 3D images to control the display effects. During the application process, it is helpful to reduce the amount of code.

Figure 2:
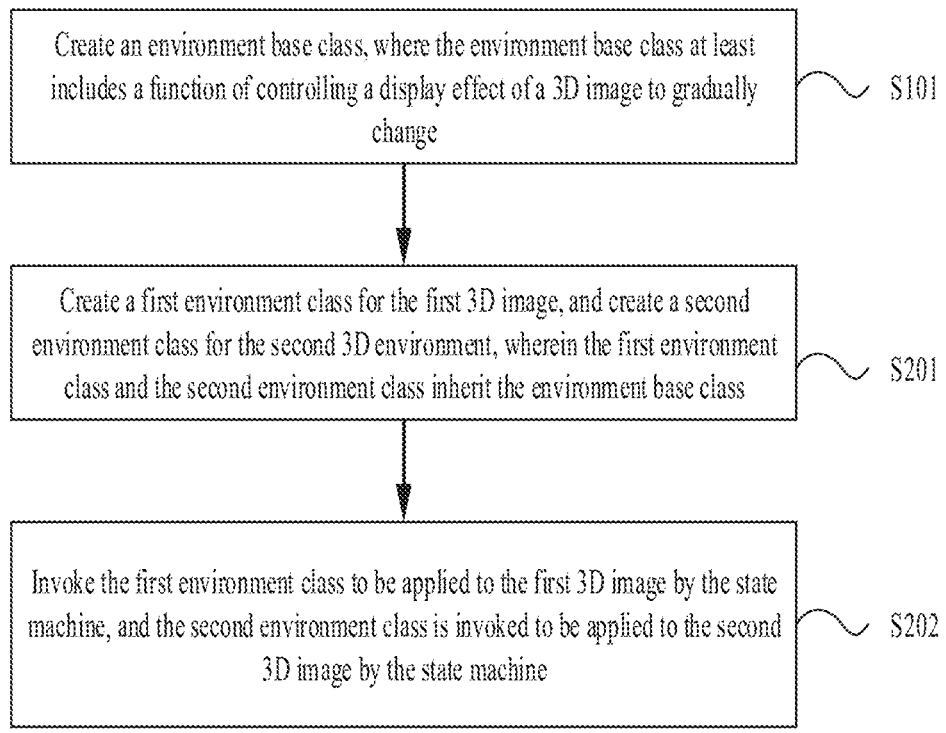
FIG. 2 is a schematic flowchart of another image display according to an implementation of the present disclosure.

It should be noted that, whether the environment base class controls the display effect to be gradually decreased or control the display effect to be gradually increased can be determined depending on the selected 3D image. For example, for a 3D image selected first, the environment base class controls the display effect to be gradually decreased, and for a 3D image selected subsequently, the environment base class controls the display effect to be gradually FIG. 2 is a schematic flowchart of another image display according to an implementation of the present disclosure. As shown in FIG. 2, the method further includes the following steps.

In step S201, a first environment class for the first 3D image is created, and a second environment class for the second 3D environment is created, wherein the first environment class and the second environment class inherit the environment base class; for example, step S201 can be executed after step S101;

Wherein invoking the environment base class to apply the environment base class to the first 3D image and the second 3D image by the state machine includes the following step.

In step S202, the first environment class is invoked to be applied to the first 3D image by the state machine, and the second environment class is invoked to be applied to the second 3D image by the state machine.

The first environment class is configured to control the display effect of the first 3D image to be gradually decreased, and the second environment class is configured to control the display effect of the second 3D image to be gradually decreased.

In an implementation, for different 3D images, the environment base class can be adjusted as needed to form an environment class corresponding to the 3D image, so as to improve the effect of the environment class adjusting the specific 3D image.

For example, a first environment class can be created for a first 3D image, a second environment class can be created for a second 3D environment, and the first environment class and the second environment class inherit the environment base class, that is, to obtain the first environment class and the second environment class, it only needs to make a little adjustment on the basis of the corresponding code of the environment base class without making a lot of change to the code.

For example, the type of display effect in the environment class can be adjusted. For the first environment class, the transparency of the objects in the 3D image can be controlled to gradually change, and for the second environment class, the shape of the objects in the 3D image can be controlled to gradually change, for example, for a dissolving effect, so that the environment class can adjust the display effects of different 3D images to satisfy different requirements.

Figure 3:
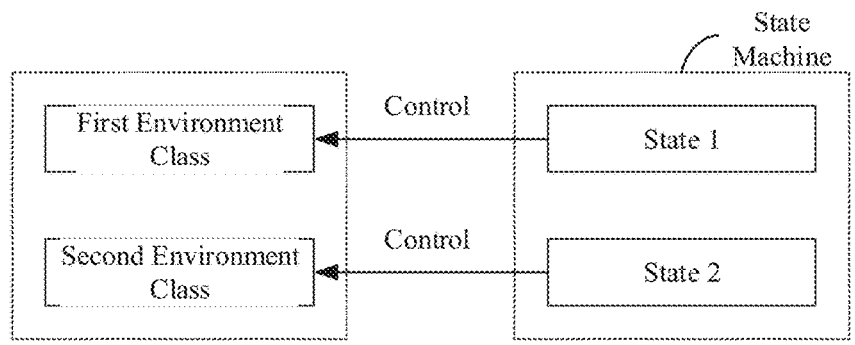
FIG. 3 is a schematic diagram showing a correspondence between a state and an environment class according to an implementation of the present disclosure.

FIG. 3 is a schematic diagram showing a correspondence between a state and an environment class according to an implementation of the present disclosure.

In an implementation, as shown in FIG. 3, for the state machine, different 3D images corresponding to different states can be created, and different states corresponding to different environment classes. For example, state 1 corresponds to the first environment class, and state 2 corresponds to the second environment class, and the state corresponding to the 3D image that the user needs to switch to can be determined according to the user's input, such as state 1 and state 2, then the first environment class can be invoked through state 1 to be applied to the first 3D image, and the second environment class can be invoked through state 2 to be applied to the second 3D image, thereby controlling the display effect of the first 3D image to be gradually decreased, and controlling the display effect of the second 3D image to be gradually decreased.

Optionally, the environment base class further includes a function of controlling a display angle of a 3D image to gradually change, the first environment base class is also configured to control the display angle of the first 3D image to gradually change from a first angle to a second angle, and the second environment base class is configured to control the display angle of the second 3D image to gradually change from the first angle to the second angle.

In an implementation, in addition to adjusting a display effect of a 3D image, the environment class can also adjust the display angle of the 3D image, thereby facilitating the user to view the changed 3D image from a desired angle.

Figure 4:
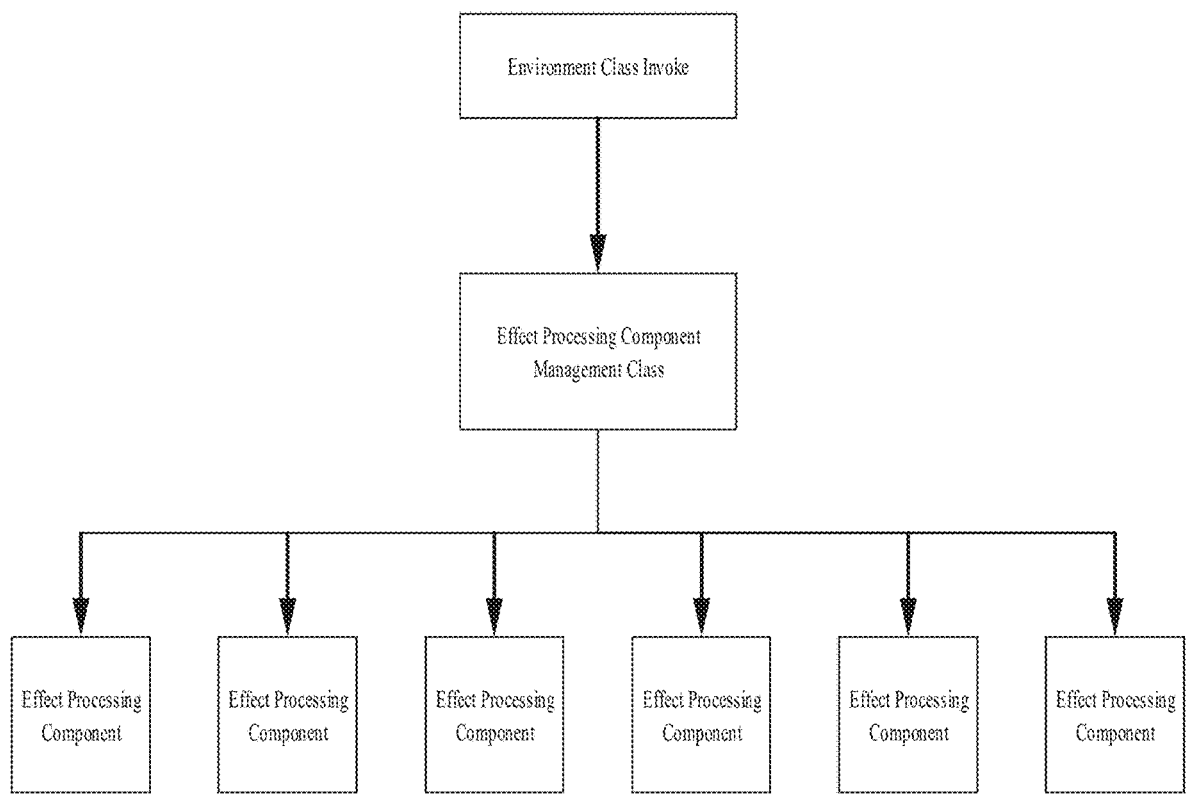
FIG. 4 is a schematic diagram showing an effect processing component management class and an effect processing component according to an implementation of the present disclosure.

FIG. 4 is a schematic diagram showing an effect processing component management class and an effect processing component according to an implementation of the present disclosure.

In an implementation, as shown in FIG. 4, when the environment base class is invoked by the state machine, the effect processing component management class is invoked.

Wherein the effect processing component management class is hung on the root node of the first 3D image and the second 3D image, and when the effect processing component management class is invoked, the effect processing component management class will hang the processing component on a grid of the first 3D image and the second 3D image, and the effect processing component is configured to adjust a material ball corresponding to the grid to control the display effects of the first 3D image and the second 3D image to gradually change.

In an implementation, an effect processing component and an effect processing component management class can be created in advance. The effect processing component can contain specific algorithms for adjusting the display effect, and there can be one or more effect processing components. In the effect processing component management class, an interface for external invokes is provided, so that it can be invoked by the environment base class.

For all 3D images, the effect processing component management class can be hung on its root node in advance. When the environment base class is invoked by the state machine, the effect processing component management class can be invoked. Since the effect processing component management class is hung on the root node of the first 3D image and the second 3D image, when the effect processing component management class is invoked, the effect processing component can be hung on the grid of the first 3D image and the second 3D image, and the effect processing component can adjust the material ball corresponding to the grid, to control the display effects of the first 3D image and the second 3D image to gradually change.

Accordingly, it is possible not provide code for specifically adjusting a display effect in the environment base class, but provide code for adjusting a display effect in the effect processing component. Then, when the environment base class is invoked, since the amount of code is small, the environment base class can be invoked quickly. In addition, if the processing component management class is hung on the root node of the 3D image in advance, and there is no need to perform complex processing on the processing component management class during the invoking process, which is beneficial to improve the switching speed.

It should be noted that the "hang on" recorded in the implementations of the present disclosure can be understood as binding. For example, hanging the effect processing component management class on the root node means binding the effect processing component management class to the root node when running the effect processing component management class, the nodes on all branches (that is, the grid) under the root node can be traversed, and then the effect processing component is hung on the grid, that is, the effect processing component is bound to the grid. Then the function of the effect processing component can be applied to the grid, specifically it can be applied to the material ball of the grid, so that the parameters in the material ball can be adjusted through the effect processing component to control the display effect of the 3D model corresponding to the grid to gradually change. This in turn makes the overall 3D image gradually change.

In an implementation, the 3D images involved in all the implementations of the present disclosure can be created by the software Unity. The 3D image can contain a plurality of 3D objects. Each object is composed of a grid and a material ball (also can be understood as a shader), and by hanging the effect processing component on each grid, the material ball corresponding to the grid can be adjusted, and then the display effect of each object in the 3D image can be adjusted.

In an implementation, the environment base class, the first environment class, the second environment class, the state machine, the effect processing component management class, the effect processing component, the DoTween animation, etc., can be created in the software Unity.

When the method is applied to an electronic device, different versions can be made according to specific needs and scenarios. For example, the electronic device is a mobile phone. For the software Unity configured to implement the method, a mobile phone application version can be made, for example, the electronic device is a computer, and a web page version can be made for the Unity software configured to implement the method.

Figure 5:
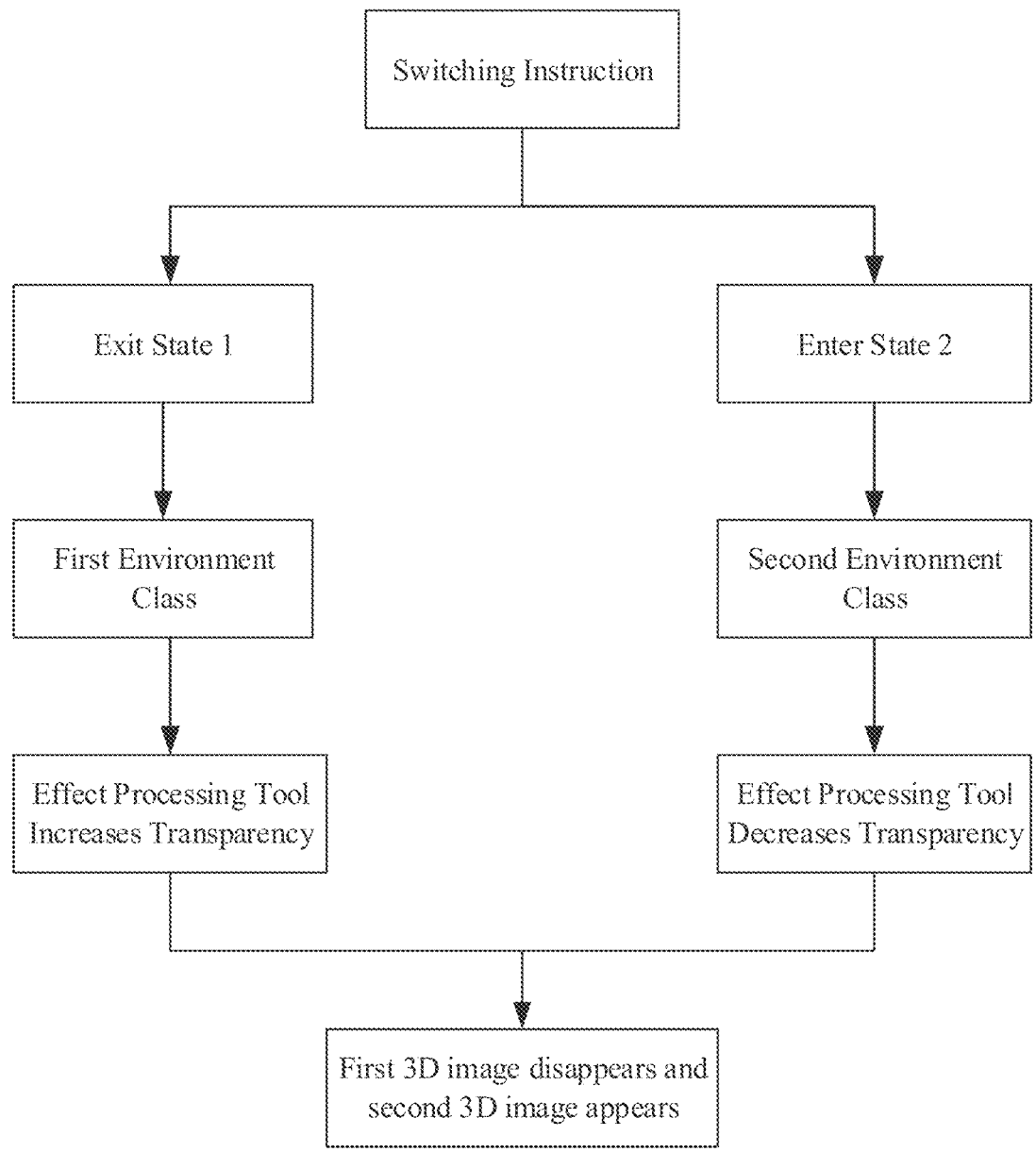
FIG. 5 is a schematic diagram showing a switching process according to an implementation of the present disclosure.

FIG. 5 is a schematic diagram showing a switching process according to an implementation of the present disclosure.

As shown in FIG. 5, for example, on the basis of the implementations shown in FIGS. 3 and 4, the user inputs a switching instruction, selects state 1 as the start, and selects state 2 as the end, then it can be determined that the switching action is from the first 3D image switches to the second 3D image.

The first environment class can be invoked through state 1, the first environment class invokes the effect processing component management class, and the effect processing component management class hangs the effect processing component on the grid of the first 3D image, and then the effect processing component adjusts the material ball corresponding to the grid, to control the display effect of the first 3D image to gradually change. For example, the parameter corresponding to the transparency in the material ball is adjusted from 1 to 0, so that the first 3D image becomes gradually transparent.

Also, the second environment class can be invoked through state 2, the second environment class invokes the effect processing component management class, and the effect processing component management class hangs the effect processing component on the grid of the second 3D image, and then the effect processing component adjusts the material ball corresponding to the grid, to control the display effect of the second 3D image to gradually change. For example, the parameter corresponding to the transparency in the material ball is adjusted from 0 to 1, so that the second 3D image gradually appears.

In addition, the function of the effect processing component can be expanded. For example, in addition to adjusting the above display effect, speed, zoom ratio, etc. can also be adjusted.

Optionally, the effect processing component is also configured to generate a DoTween animation to display the process of controlling the display effects of the first 3D image and the second 3D image to gradually change.

Figure 6:
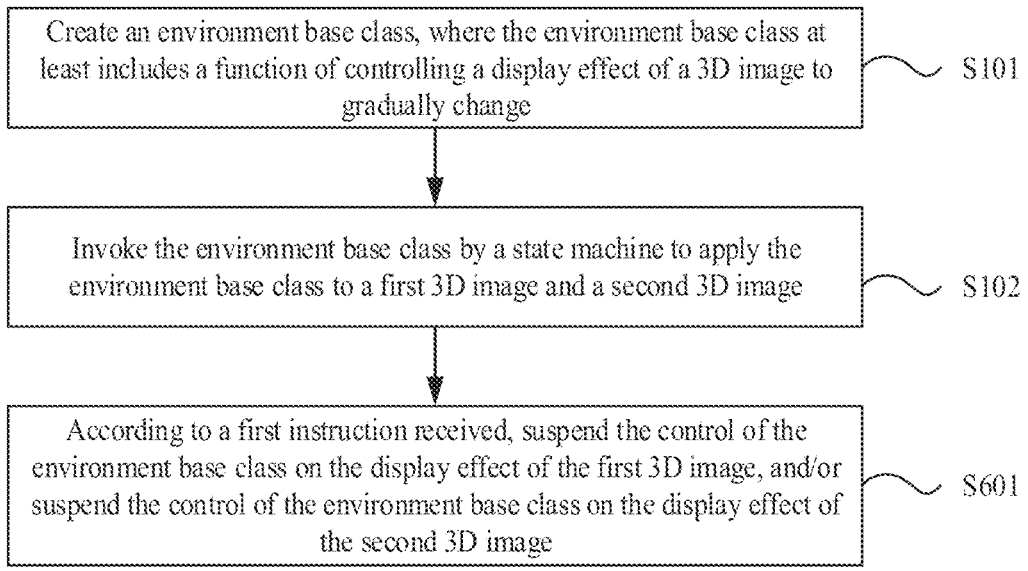
FIG. 6 is a schematic flowchart of still another image display according to an implementation of the present disclosure.

FIG. 6 is a schematic flowchart of still another image display according to an implementation of the present disclosure. As shown in FIG. 6, the method further includes the following steps.

In step S601, according to a first instruction received, the control of the environment base class on the display effect of the first 3D image is suspended, and/or the control of the environment base class on the display effect of the second 3D image is suspended. For example, step S601 can be executed during the execution of step S102.

In an implementation, during the process of switching from the first 3D image to the second 3D image, the user can input a first instruction to suspend the switching process. Since when the first 3D image is switched to the second 3D image, the display can be overlapped, so the switching process is suspended, so that it is convenient for the user to view the effect of the overlapping display of the first 3D image and the second 3D image.

For example, the display effect includes transparency, and then when the switching process is suspended, since the transparency of the object in the first 3D image is gradually decreased, it is convenient for the user to view the occluded object in the first 3D image.

Figure 7:
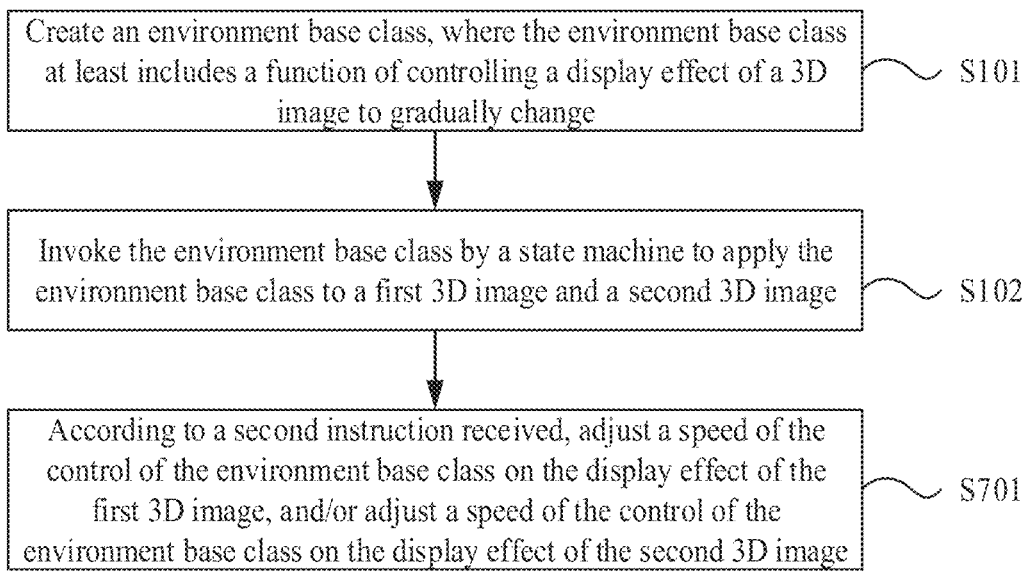
FIG. 7 is a schematic flowchart of still another image display according to an implementation of the present disclosure.

FIG. 7 is a schematic flowchart of still another image display according to an implementation of the present disclosure. As shown in FIG. 7, the method further includes the following steps.

In step S701, according to a second instruction received, a speed of the control of the environment base class on the display effect of the first 3D image is adjusted, and/or a speed of the control of the environment base class on the display effect of the second 3D image is adjusted. For example, step S701 can be executed during or after the execution of step S102.

In an implementation, during the process of switching from the first 3D image to the second 3D image, the user can input a second instruction to adjust the switching speed, for example, the speed can be improved to complete the switching as soon as possible, for example, the speed can be reduced for the user to watch the details of the switching process, or the speed is adjusted to change in a reverse direction, for example, the display effect of the first 3D image is increased, and the display effect of the second 3D image is decreased.

FIGS. 8A to 8D are schematic diagrams showing a switching process according to an implementation of the present disclosure.

In an implementation, taking transparency as a display effect as an example, the first 3D image corresponds to an office environment, and the second 3D image corresponds to a parking lot environment.

In the process of switching from the first 3D image to the second 3D image, the transparency of each 3D object in the office environment can be gradually decreased, and the transparency of each 3D object in the parking lot environment can be gradually increased. Also, in the process of adjusting the transparency, the display angle of view can also be adjusted gradually, for example, from the overhead angle of the office to the overhead angle of the parking lot.

Figure 8A:
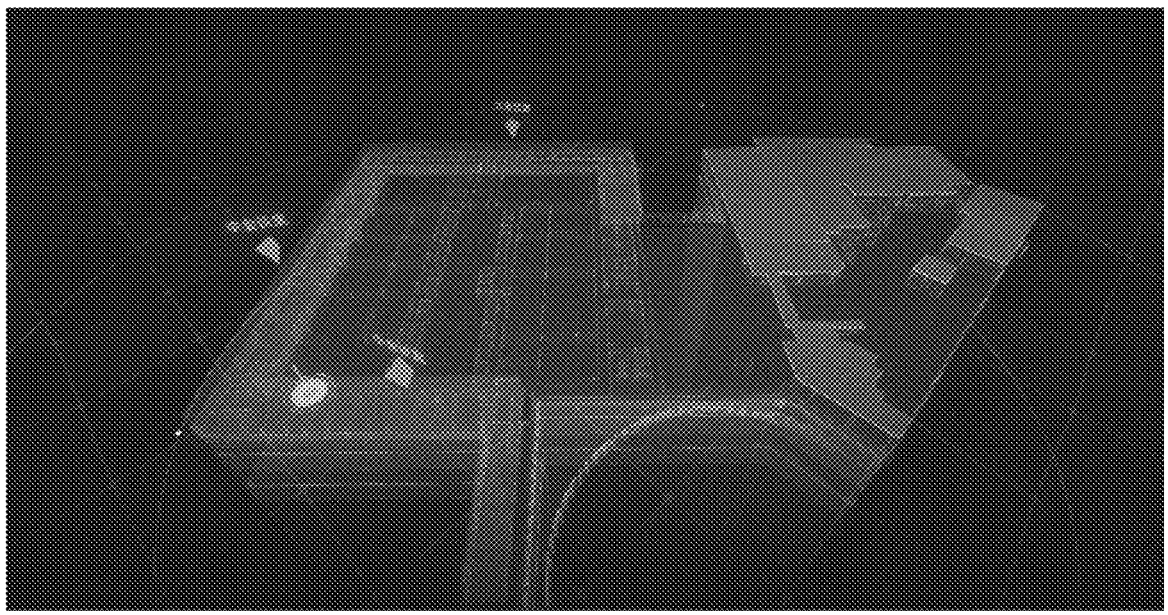
FIGS. 8A to 8D are schematic diagrams showing a switching process according to an implementation of the present disclosure.
Figure 8B:
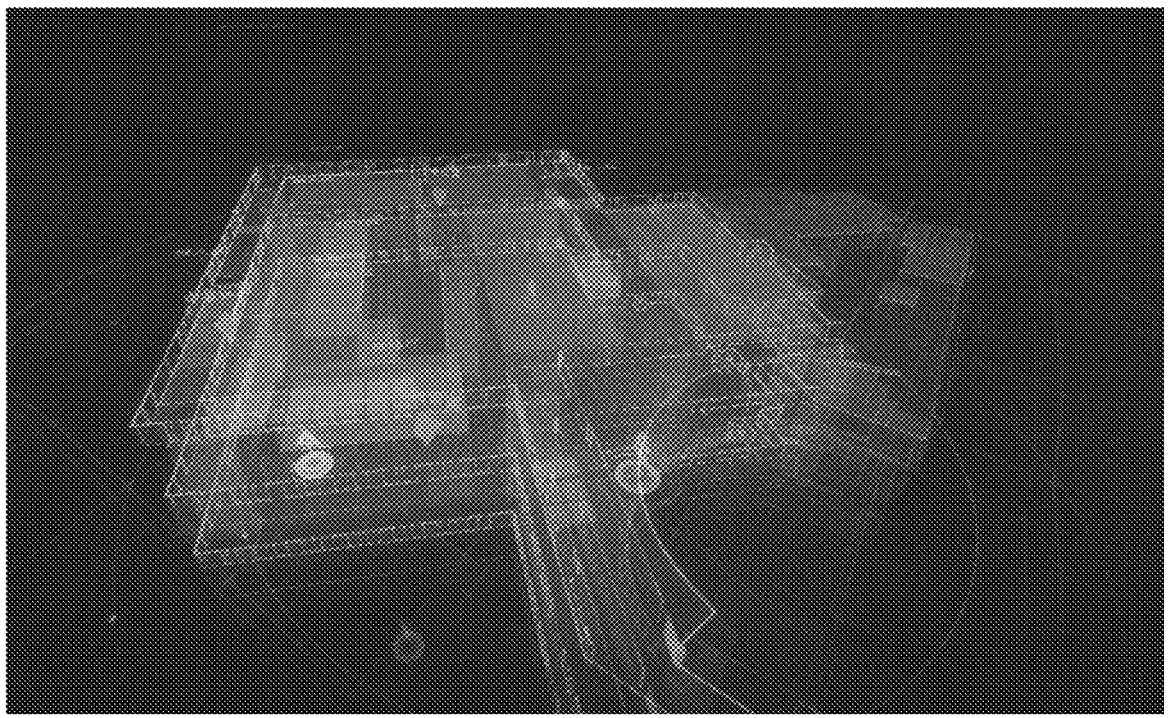
Figure 8C:
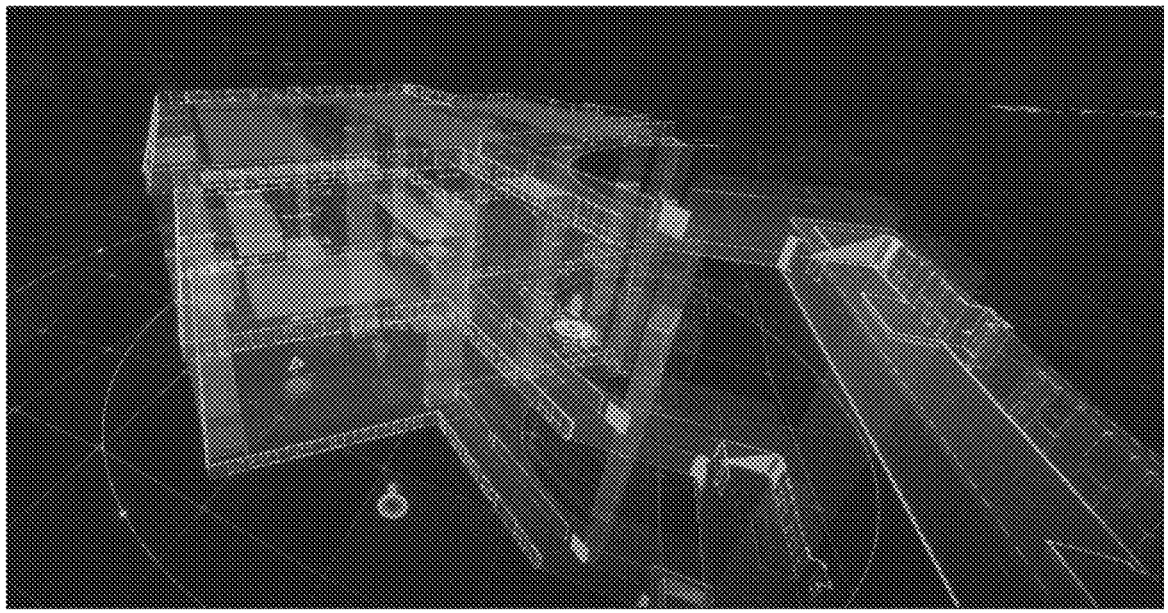
Figure 8D:
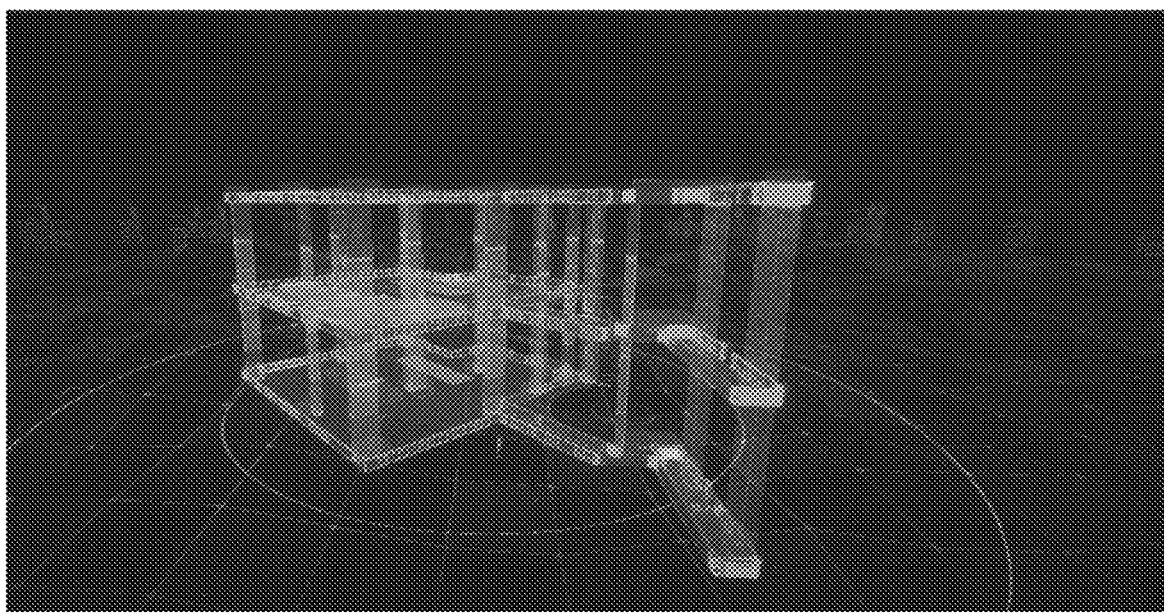

According to FIG. 8B and FIG. 8C, during the switching process, the transparency of the object in the first 3D image gradually decreases, while the transparency of the object in the second 3D image increases. Finally, the first 3D image in FIG. 8A completely disappears and appears the second 3D image in FIG. 8D.

In addition to using transparency as the display effect in the foregoing implementation, the display effect can also be shape, size, position, etc.

For example, the shape can be used as the display effect. In the process of switching from the first 3D image to the second 3D image, the shape of each 3D object in the office environment can gradually change, and the shape of each 3D object in the parking lot environment can gradually change. For example, each 3D object in the office environment is gradually melted, and each 3D object in the parking lot environment is gradually formed. Finally, all the objects in the first 3D image melt and disappear, and all the objects in the second 3D image are formed to required shapes, that is, the first 3D image completely disappears and appears as a second 3D image. However, in this process, the display viewing angle can also be adjusted gradually.

In addition to the office and parking lot used as application scenarios in the foregoing implementation, restaurants, shopping malls, house sales offices, etc. can also be used as application scenarios.

For example, take a house sales office as an example. The first 3D image corresponds to house 1, and the second 3D image corresponds to house 2. A customer can view the first 3D image in the center of the screen to learn about house 1. When the user needs to learn about information on house 2, the first 3D image can be switched to the second 3D image. During the switching process, the display effect of the first 3D image can gradually change and decreased, and the display effect of the second 3D image can be gradually provided until the first 3D image disappears completely, and the second 3D image appears completely, and the customer can see the gradual disappearance of house 1 and gradual emergence of house 2.

Since house 1 does not disappear instantly during the switching process, and house 2 does not appear instantaneously. The two are displayed in a superimposed manner, so that the customer can intuitively see the difference between house 1 and house 2 during the switching process, to accurately understand the difference between house 1 and house 2.

An embodiment of the present disclosure also provides an electronic device, including:
 a processor;
 a memory for storing processor executable instructions;
  wherein the processor is configured to execute the steps in the method described in any of the foregoing implementations.

Optionally, the electronic device is an embedded terminal, and the embedded terminal is set in an actual environment where the first 3D image and/or the second 3D image are located.

In an implementation, the above method is executed on the embedded terminal, so that the user in the actual environment can directly input instructions on the embedded terminal to control the switching between the first 3D image and the second 3D image. Since the embedded terminal is located in the environment where the 3D images are located, during the switching process, the user can intuitively see the corresponding relationship between the actual environment and the 3D images for observation, navigation and other actions.

In an implementation, an instruction receiving module is provided on the embedded terminal for receiving instructions and transmitting the received instructions to the processor, wherein the processor is configured to adjust the control of the environment base class on the display effect of the first 3D image, and/or adjust the control of the environment base class on the display effect of the second 3D image.

In an implementation, the instruction used by the receiving module to receive includes at least one of the following:
a touch instruction, a voice instruction, a physical button instruction, or a light control instruction.

For example, on the screen of the embedded terminal, a plurality of virtual buttons corresponding to the environments can be displayed, including an office corresponding to the first 3D image and a parking lot corresponding to the second 3D image.

When a 3D image is not currently displayed on the screen, the user can click a virtual button to generate a touch instruction that directly displays the 3D image of the environment corresponding to the virtual button. For example, clicking on an office virtual button will display the first 3D image.

When a 3D image is currently displayed on the screen, when the user clicks on a virtual button, a touch instruction for switching from displaying the current 3D image to displaying the 3D image of the environment corresponding to the virtual button can be generated. The 3D image is switched to display the second 3D image, for example, according to the effect shown in FIG. 8A to FIG. 8D.

In an implementation, the processor is further configured to:
according to a first instruction received, suspend the control of the environment base class on the display effect of the first 3D image, and/or suspend the control of the environment base class on the display effect of the second 3D image.

In an implementation, the processor is further configured to:
according to a second instruction received, adjust a speed of the control of the environment base class on the display effect of the first 3D image, and/or adjust a speed of the control of the environment base class on the display effect of the second 3D image.

An embodiment of the present disclosure also provides a computer-readable storage medium on which a computer program is stored, and when the program is executed by a processor, the steps in the method described in any of the foregoing implementations are performed.

Corresponding to the above method for displaying an image, the present disclosure also provides an embodiment of an apparatus for displaying an image.

An embodiment of the present disclosure provides an apparatus for displaying an image, which includes one or more processors working individually or in cooperation, and the processors are configured to:
create an environment base class, wherein the environment base class at least includes a function of controlling a display effect of a 3D image to gradually change;
invoke, by a state machine, the environment base class to apply the environment base class to a first 3D image and a second 3D image;
wherein the environment base class is configured to control the display effect of the first 3D image to be gradually decreased, and control the display effect of the second 3D image to be gradually increased.

In an implementation, the processor is further configured to:
create a first environment class for the first 3D image, and create a second environment class for the second 3D environment, wherein the first environment class and the second environment class inherit the environment base class;
and invoke, by the state machine, the first environment class to apply the first environment class to the first 3D image, and invoke, by the state machine, the second environment class to apply the second environment class to the second 3D image;
wherein the first environment class is configured to control the display effect of the first 3D image to be gradually decreased, and the second environment class is configured to control the display effect of the second 3D image to be gradually decreased.

In an implementation, the environment base class further includes a function of controlling a display angle of the 3D image to gradually change, the first environment base class is also configured to control the display angle of the first 3D image to gradually change from a first angle to a second angle, and the second environment base class is configured to control the display angle of the second 3D image to gradually change from the first angle to the second angle.

In an implementation, when the environment base class is invoked by the state machine, an effect processing component management class is invoked;
wherein the effect processing component management class is hung on a root node of the first 3D image and the second 3D image, and when the effect processing component management class is invoked, the effect processing component management class hangs the effect processing component on a grid of the first 3D image and the second 3D image, and the effect processing component is configured to adjust a material ball corresponding to the grid, to control the display effects of the first 3D image and the second 3D image to gradually change.

In an implementation, the effect processing component is also configured to generate a DoTween animation to display the process of controlling the display effects of the first 3D image and the second 3D image to gradually change.

In an implementation, the processor is further configured to:
according to a first instruction received, suspend the control of the environment base class on the display effect of the first 3D image, and/or suspend the control of the environment base class on the display effect of the second 3D image.

In an implementation, the processor is further configured to:
according to a second instruction received, adjust a speed of the control of the environment base class on the display effect of the first 3D image, and/or adjust a speed of the control of the environment base class on the display effect of the second 3D image.

In an implementation, the second 3D image is superimposed and displayed on the first 3D image.

In an implementation, the display effect includes at least one of the following:
transparency, shape, size, position.

In an implementation, the first 3D environment image and/or the second 3D environment image includes at least one of the following:
an office, a parking lot, a restaurant, a shopping center, or a house sales office.

In the present disclosure, the terms "first" and "second" are only used for descriptive purposes, and cannot be understood as indicating or implying relative importance. The term "plurality" refers to two or more, unless specifically defined otherwise.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

What is claimed is:

1. A method for displaying an image implemented with classes, comprising:
    creating an environment base class, wherein the environment base class at least comprises a function of controlling a display effect of a 3D image to gradually change;
    invoking, by a state machine, the environment base class to apply the environment base class to a first 3D image and a second 3D image,
    wherein the environment base class is configured to control a display effect of the first 3D image to be gradually decreased, and control a display effect of the second 3D image to be gradually increased,
    creating a first environment class for the first 3D image, and creating a second environment class for the second 3D image, wherein the first environment class and the second environment class inherit the environment base class;
    wherein invoking, by the state machine, the environment base class to apply the environment base class to the first 3D image and the second 3D image comprises:
        invoking, by the state machine, the first environment class to apply the first environment class to the first 3D image, and invoking, by the state machine, the second environment class to apply the second environment class to the second 3D image;
    wherein the first environment class is configured to control the display effect of the first 3D image to be gradually decreased, and the second environment class is configured to control the display effect of the second 3D image to be gradually decreased.

2. The method of claim 1, wherein the environment base class further comprises a function of controlling a display angle of a 3D image to gradually change, and the first environment base class is also configured to control a display angle of the first 3D image to gradually change from a first angle to a second angle, and the second environment base class is configured to control a display angle of the second 3D image to gradually change from a first angle to a second angle.

3. The method of claim 1, wherein when the environment base class is invoked by the state machine, an effect processing component management class is invoked;
    wherein the effect processing component management class is hung on a root node of the first 3D image and the second 3D image, and when the effect processing component management class is invoked, the effect processing component management class hangs an effect processing component on a grid of the first 3D image and the second 3D image, and the effect processing component is configured to adjust a material ball corresponding to the grid, to control the display effects of the first 3D image and the second 3D image to gradually change.

4. The method of claim 3, wherein the effect processing component is also configured to generate a DoTween animation to display a process of controlling the display effects of the first 3D image and the second 3D image to gradually change.

5. The method of claim 1, further comprising:
    according to a first instruction received, suspending the control of the environment base class on the display effect of the first 3D image, and/or suspending the control of the environment base class on the display effect of the second 3D image.

6. The method of claim 1, further comprises:
    according to a second instruction received, adjusting a speed of the control of the environment base class on the display effect of the first 3D image, and/or adjusting a speed of the control of the environment base class on the display effect of the second 3D image.

7. The method of claim 1, wherein the second 3D image is superimposed and displayed on the first 3D image.

8. The method of claim 1, wherein the display effect comprises at least one of:
    transparency, shape, size, position.

9. The method of claim 1, wherein the first 3D image and/or the second 3D image comprises at least one of:
    an office, a parking lot, a restaurant, a shopping center, or a house sales office.

10. An electronic device, comprising:
    a processor;
    a memory for storing processor executable instructions;
    wherein the processor is configured to perform the steps in the method of claim 1.

11. The electronic device of claim 10, wherein the electronic device is an embedded terminal, and the embedded terminal is provided in an actual environment where the first 3D image and/or the second 3D image are located.

12. The electronic device of claim 11, wherein an instruction receiving module is provided on the embedded terminal for receiving an instruction and transmitting the received instruction to the processor, wherein the processor is configured to adjust the control of the environment base class on a display effect of the first 3D image and/or adjust a control of the environment base class on the display effect of the second 3D image according to the instruction.

13. The electronic device of claim 12, wherein the instruction to be received by the receiving module comprises at least one of:
    a touch instruction, a voice instruction, a physical button instruction, or a light control instruction.

14. A non-transitory computer-readable storage medium having a computer program stored thereon, wherein the program implements the steps in the method of claim 1 when the program is executed by a processor.

15. An apparatus for displaying an image implemented with classes, comprising one or more processors working individually or in cooperation, and the processors are configured to:

create an environment base class, wherein the environment base class at least comprises a function of controlling a display effect of a 3D image to gradually change;

invoke, by a state machine, the environment base class to apply the environment base class to a first 3D image and a second 3D image;

wherein the environment base class is configured to control a display effect of the first 3D image to be gradually decreased, and control a display effect of the second 3D image to be gradually increased, create a first environment class for the first 3D image, and create a second environment class for the second 3D image, wherein the first environment class and the second environment class inherit the environment base class;

and configured to:

invoke, by the state machine, the first environment class to apply the first environment class to the first 3D image, and invoke, by the state machine, the second environment class to apply the second environment class to the second 3D image;

wherein the first environment class is configured to control the display effect of the first 3D image to be gradually decreased, and the second environment class is configured to control the display effect of the second 3D image to be gradually decreased.

16. The apparatus of claim 15, wherein the environment base class further comprises a function of controlling a display angle of a 3D image to gradually change, and the first environment base class is also configured to control a display angle of the first 3D image to gradually change from a first angle to a second angle, and the second environment base class is configured to control a display angle of the second 3D image to gradually change from a first angle to a second angle.

17. The apparatus of claim 15, wherein when the environment base class is invoked by the state machine, an effect processing component management class is invoked;

wherein the effect processing component management class is hung on a root node of the first 3D image and the second 3D image, and when the effect processing component management class is invoked, the effect processing component management class hangs an effect processing component on a grid of the first 3D image and the second 3D image, and the effect processing component is configured to adjust a material ball corresponding to the grid, to control the display effects of the first 3D image and the second 3D image to gradually change.

18. The apparatus of claim 15, wherein the processors are configured to:

according to an instruction received, adjust a speed of the control of the environment base class on the display effect of the first 3D image, and/or adjusting a speed of the control of the environment base class on the display effect of the second 3D image.

* * * * *